UNITED STATES PATENT OFFICE.

MAX BOCKMÜHL AND GUSTAV EBERT, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ALKYLSULFITES OF AMINO-SUBSTITUTED PYRAZOLONES AND PROCESS OF MAKING SAME.

1,056,881. Specification of Letters Patent. Patented Mar. 25, 1913.

No Drawing. Application filed June 25, 1912. Serial No. 705,799.

*To all whom it may concern:*

Be it known that we, MAX BOCKMÜHL, Ph. D., chemist, and GUSTAV EBERT, Ph. D., chemist, citizens of the Empire of Germany, residing at Höchst-on-the-Main, Germany, have invented certain new and useful Improvements in Alkylsulfites of Amino-Substituted Pyrazolones and Processes of Making Same, of which the following is a specification.

We have found that new substances of great therapeutic value can be obtained by causing formaldehyde-bisulfite of the alkali-metals or ammonium to act upon amino-substituted pyrazolones. In the place of the formaldehyde-bisulfite-alkali-metals or ammonium there may be used their homologues, such as the acet- or propion- aldehyde-bisulfite. The technical preparation of these bodies in a pure state involves some difficulties. For instance if the solutions, obtained by heating 4-antipyrylamin or its derivatives with a solution of formaldehyde-bisulfite, are evaporated on the steam-bath while stirring, and the resulting mass is then dissolved in hot alcohol, the filtration of the turbid solutions thus obtained is, even when the filtration is effected *in vacuo* or by compressed air, so difficult, owing to the fine subdivision of the particles of the separated bisulfite, that the substances crystallize while yet on the filter. Although the filtration is greatly improved by very slowly evaporating the liquids of the reaction, it appears that in this case the isolated bodies are not uniform, because they partly decompose when their solutions are heated for a long time on the water-bath. Now we have made the observation that the products of the reaction can be very easily purified by allowing the liquids of the reaction, obtained by heating 4-antipyrylamin or its derivatives with a solution of formaldehyde bisulfite, to stand in open, flat basins at ordinary temperature, or at any temperature up to 50° C., either in the air or *in vacuo*, then dissolving in hot methyl alcohol the substances which have solidified after some time into crystal-cakes, evaporating the solutions, which can be easily filtered, and finally redissolving the residues in alcohol. The alkylsulfites of the amino-substituted pyrazolones are obtained as white powders, readily soluble in water, but difficultly soluble in benzene, acetone and ether.

Example I: 100 parts of 1-phenyl-2.3 dimethyl-4-amino-5-pyrazolone (4 - antipyrylamin) are dissolved with aid of heat in 37 parts of a solution of formaldehyde of 38% strength and 132 parts of sodium bisulfite of 39% strength, the solution is poured in flat basins and left to itself for some days at ordinary temperature or at any temperature up to 50° C. The solidified masses are then freed from the mother-liquor adhering to them by pressure or centrifuging, and dissolved, while hot, in methyl alcohol in the proportion of 1:15. The filtered solution is evaporated *in vacuo* until it crystallizes, and after cooling the separated product is filtered off and again purified by dissolving 100 parts of the compound in 50 parts of hot water, adding 500 parts of hot alcohol (96%), and filtering on the product crystallizing out in the cold.

The compound thus obtained corresponds to the formula:

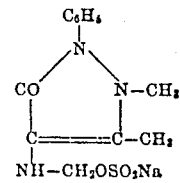

It sinters at 231–233° C. with decomposition; it dissolves in cold water in the proportion of 1:1, and is almost insoluble in the usual organic solvents except alcohol. The addition of barium chlorid and mercury chlorid gives rise to slight opalescence in its aqueous solution. The addition of silver nitrate does not at first cause the solution to change, but it soon becomes turbid and separates silver. The addition of a small quantity of ferric chlorid causes the solution to assume a dark color which disappears again after a short time; if an excess of ferric chlorid is added, it assumes a dark brown color which after some minutes turns cherry-red. When diluted hydrochloric acid is added, the aqueous solution remains clear.

Example II: 10.7 parts of 1-p-tolyl-2.3.-dimethyl-4-amino-5-pyrazolone (see German Patent 92009) are heated for some time on the water-bath with a solution of 3.7 parts of formaldehyde and 13.2 parts of sodium-bisulfite, and the product obtained is dried on a clay slab and then re-dissolved in chloroform. The substance, dried over sulfuric acid, commences to sinter at 120° C. and decomposes at 125° with effervescence. The compound is very readily soluble in water and also dissolves in hot alcohol and chloroform.

Example III: 12.2 parts of 1-p-ethoxy-phenyl-2.3-dimethyl-4-amino-5-pyrazolone are heated for some time on the water-bath with a solution of 3.7 parts of formaldehyde and 13.2 parts of sodium-bisulfite, and then purified as indicated in Example II. The substance is dried over sulfuric acid, whereby the melting- and decomposition-point is raised, in consequence of the loss of water of crystallization (the melting point varying from 113–115° C.) It is readily soluble in water and also in hot alcohol and chloroform. The 1-p-ethoxyphenyl-2.3-dimethyl-4-amino-5-pyrazolone, which serves as parent-product, is obtained according to the method usually employed for preparing the 4-aminoantipyrin, namely, by reducing the p-ethoxy-2.3-dimethyl-4-nitroso-5-pyrazolone obtained from p-ethoxy-2.3-dimethyl-5-pyrazolone treated with nitrite. Its melting point lies between 132–133° C.

Example IV: 20 parts of 1-p-aminophenyl-2-3-dimethyl-5-pyrazolone (see D. R. P. 92990) are dissolved, while hot, in 60 parts of water, mixed with 8 parts of technical formaldehyde and 28 parts of a solution of sodium-bisulfite, and allowed to stand over night. The mass is then evaporated on the water-bath until it assumes a syrupy consistency, the residue is dissolved in alcohol, and the filtered solution precipitated with acetone. The thus-produced sodium salt of the 1-p-aminophenyl-2-3-dimethyl-5-pyrazolone-methyl sulfite is hygroscopic, readily soluble in water and methyl alcohol, more difficultly soluble in ethyl alcohol, insoluble in ether and acetone.

Example V: A solution prepared by aid of heat with 22 parts of 1-p-aminophenyl-2.3.4-trimethyl-5-pyrazolone (D. R. P. 238256) in 100 parts of water, is mixed with 28 parts of a solution of sodium-bisulfite and 8 parts of technical formaldehyde, allowed to stand over night, and then evaporated until it crystallizes. The sodium salt, separated by filtration from the mother liquor, is obtained in a pure state by recrystallization in alcohol of 90% strength. It forms a crystalline powder which is stable in the air, readily soluble in water and methyl alcohol, difficultly soluble in ethyl alcohol, and insoluble in ether and acetone.

Example VI: 10.7 parts of 1-p-aminophenyl-3.4.4 trimethyl-pyrazolone are digested on the water-bath with a solution consisting of 3.7 parts of dissolved formaldehyde and 13.2 parts of a technical solution of bisulfite, until the mass, at first solid and agglomerated, is dissolved, which takes about ¼ hour. The whole is allowed to stand on the steam bath for a short time longer and is then poured into a basin, in which it soon solidifies. After completely cooling, the mass is carefully separated by filtration from the adhering mother-liquor and dissolved in 4–5 times its quantity of cold methyl alcohol. The solution is clarified by filtration and evaporated, and the residue solidifying on cooling is redissolved from alcohol. The substance melts at 127° C. with decomposition. It very readily dissolves in water and methyl alcohol, more difficultly in ethyl alcohol, scarcely in acetone, chloroform and ether.

Example VII: 10 gr. of aminoantipyrin are heated for some time on the water-bath with a solution of 2.2 gr. of acetaldehyde and 13.2 gr. of a solution of sodium-bisulfite (of about 39%), and the resulting clear solution is left to itself. On the following day the crystalline magma is filtered off, the residue dried upon a clay slab, and redissolved in alcohol. The substance dissolves very readily in water, readily in hot alcohol and methyl alcohol, more difficultly in chloroform. It is insoluble in ether, acetone and benzene, and has a melting point of 124–125° C.

Example VIII: 10 gr. of aminoantipyrin are dissolved by aid of heat in a solution of 2.9 gr. of propionaldehyde and 13.2 gr. of a solution of sodium bisulfite, the further operations being carried out as indicated in Example VII. The raw product is redissolved in absolute alcohol (1:2). The substance thus obtained melts not quite exactly between 124–125° C. At 130° C. decomposition sets in. The compound is very readily soluble in water, and is also soluble in alcohol and hot chloroform.

In preparing the potassium and ammonium salts, the corresponding potassium- and ammonium-bisulfite, respectively, are substituted for the sodium bisulfite, the further operations being as indicated in Examples 1–8 for the preparation of the sodium salt.

The pharmacological experiments with the new compounds showed that, even when administered in comparatively small doses, they are of a highly antipyretic and antineuralgic efficacy, without producing the slightest toxic symptoms. They act very rapidly and regularly, which is evidently due to their ready solubility in water. Their action is more efficacious than that of antipyrin, without being attended by undesirable secondary effects, as is the latter.

The term "alkali-metal bisulfite derivatives", used in claim 1, is intended to include the corresponding ammonium compounds.

Having now described our invention, what we claim is:

1. The process of preparing alkylsulfites of amino-substituted pyrazolones, which consists in causing alkali-metal bisulfite derivatives of the aliphatic aldehydes of the series $C_nH_{2n}O$ to act upon amino-substituted aryl-alkyl-pyrazolones.

2. The process of preparing alkylsulfites of amino-substituted pyrazolones, which consists in causing sodium formaldehyde-bisulfite to act upon 1-phenyl-2.3-dimethyl-4-amino-5-pyrazolone.

3. As new articles of manufacture, the alkyl-sulfites of the amino-substituted pyrazolones, being white powders readily soluble in water, difficultly soluble in benzene, acetone and ether, and possessing highly-antipyretic efficacy.

4. As a new article of manufacture, the body of the formula:

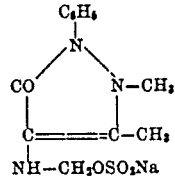

being a white powder, readily soluble in water, difficultly soluble in benzene, acetone and ether, and possessing highly-antipyretic efficacy.

In testimony whereof, we affix our signatures in presence of two witnesses.

MAX BOCKMÜHL.
GUSTAV EBERT.

Witnesses:
  JEAN GRUND,
  CARL GRUND.

---

Copies of this patent may be obtained for five cents each, by addressing the "Commissioner of Patents, Washington, D. C."